US008438557B2

(12) United States Patent
Tatsubori

(10) Patent No.: US 8,438,557 B2
(45) Date of Patent: May 7, 2013

(54) REUSING AN APPLICATION OBJECT

(75) Inventor: Michiaki Tatsubori, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 798 days.

(21) Appl. No.: 12/169,397

(22) Filed: Jul. 8, 2008

(65) Prior Publication Data

US 2009/0049426 A1 Feb. 19, 2009

Related U.S. Application Data

(63) Continuation of application No. 11/321,357, filed on Dec. 28, 2005, now abandoned.

(30) Foreign Application Priority Data

Dec. 28, 2004 (JP) ................................. 2004-380299

(51) Int. Cl.
*G06F 9/44* (2006.01)
(52) U.S. Cl.
USPC ........... 717/170; 717/165; 717/168; 719/316; 719/332
(58) Field of Classification Search .................... 717/170
See application file for complete search history.

(56) References Cited

U.S. PATENT DOCUMENTS

| 4,797,810 | A | 1/1989 | McEntee et al. |
| 5,187,786 | A | 2/1993 | Densmore et al. |
| 5,274,804 | A | 12/1993 | Jackson et al. |
| 5,392,432 | A | 2/1995 | Engelstad et al. |
| 5,481,718 | A | 1/1996 | Ryu et al. |
| 6,049,838 | A | 4/2000 | Miller et al. |
| 6,066,181 | A | 5/2000 | DeMaster |
| 6,202,208 | B1 * | 3/2001 | Holiday, Jr. ................... 717/166 |
| 6,256,712 | B1 * | 7/2001 | Challenger et al. ........... 711/141 |
| 6,408,434 | B1 | 6/2002 | Fujiwara |
| 6,438,560 | B1 | 8/2002 | Loen |
| 6,463,470 | B1 | 10/2002 | Mohaban et al. |
| 6,678,882 | B1 | 1/2004 | Hurley et al. |
| 7,287,256 | B1 | 10/2007 | Lozben et al. |
| 7,421,458 | B1 | 9/2008 | Taylor et al. |
| 2002/0023113 | A1 | 2/2002 | Hsing et al. |

(Continued)

FOREIGN PATENT DOCUMENTS

| JP | 2002014865 | 1/2002 |
| JP | 2004062716 | 2/2004 |

OTHER PUBLICATIONS

James W. Cooper, "Java™ Design Patterns: A Tutorial" Feb. 3, 2000, Addison-Wesley Professional, Chapter 14.

(Continued)

*Primary Examiner* — James D Rutten
(74) *Attorney, Agent, or Firm* — Shimokaji & Assoc., PC

(57) ABSTRACT

The present invention provides methods, apparatus and systems for reusing an application object for use with an application program, in which the object can be reused without causing nonconformity in the consistency or security, even if the object to be reused is updated. An example of a method includes detecting that the application program ends referring to the application object, detecting that the application object is updated by the application program, deciding to reuse the application object in response to detecting no update of the application object, making the application object reusable in response to the end of referring to the object, and decision to reuse the application object.

18 Claims, 8 Drawing Sheets

U.S. PATENT DOCUMENTS

| | | |
|---|---|---|
| 2002/0165870 A1 | 11/2002 | Chakraborty et al. |
| 2003/0028683 A1 | 2/2003 | Yorke et al. |
| 2003/0221022 A1 | 11/2003 | Sexton et al. |
| 2006/0090164 A1 | 4/2006 | Garden et al. |
| 2006/0101446 A1 | 5/2006 | Mariani et al. |
| 2006/0122971 A1 | 6/2006 | Berg et al. |
| 2008/0066081 A1 | 3/2008 | Monnie et al. |

OTHER PUBLICATIONS

Amsaleg, L., Franklin, M. J., and Gruber, O. 1999. Garbage collection for a client-server persistent object store. ACM Trans. Comput. Syst. 17, 3 (Aug. 1999), 153-201. DOI=http://doi.acm.org/10.1145/320656.322741.

Lunney, T. and McCaughey, A. 2003. Object persistence in Java. In Proceedings of the 2nd international Conference on Principles and Practice of Programming in Java (Kilkenny City, Ireland, Jun. 16-18, 2003). ACM International Conference Proceeding Series, vol. 42. Computer Science Press, New York, NY, 115-120.

Masanori Ohshiro, Design Pattern Guide by Java and C++—Level 4, C Magazine, vol. 11, No. 7, Japan, Softbank Publishing, Inc., Jul. 1, 1999, vol. 11.

Bill Behnaz, Biru Benaazu, Java Programming Technique, No. 1 Java World vol. 3, No. 3, Japan, IDG Communications, Inc., Mar. 1, 1999, vol. 3.

Office Action from U.S. Appl. No. 11/321,357 dated Jan. 30, 2009.

Final Office Action from U.S. Appl. No. 11/321,357 dated Jun. 10, 2009.

* cited by examiner

FIG. 6

Updating Methods in DOM

- Node
  - appendChild(Node newChild)
  - insertBefore(Node newChild, Node refChild)
  - removeChild(Node oldChild)
  - replaceChild(Node newChild, Node oldChild)
  - setNodeValue(String nodeValue)
  - setPrefix(String prefix)
- Element
  - removeAttribute(String name)
  - removeAttributeNode(Attr oldAttr)
  - setAttribute(String name, String value)
  - setAttributeNode(Attr newAttr)
- Attr
  - setValue(String value)
- CharacterData (a superclass of Text and Comment)
  - appendData(String arg)
  - deleteData(int offset, int count)
  - insertData(int offset, String arg)
  - replaceData(int offset, String arg)
  - setData(String data)
- ProcessingInstruction
  - setData(String data)

FIG. 7

Updating Methods in SDO

- DataObject
  - createDataObject()
  - set()
  - unset()
  - setBigDecimal()
  - setBigInteger()
  - setBoolean()
  - setByte()
  - setBytes()
  - setChar()
  - setDataObject()
  - setDate()
  - setDouble()
  - setFloat()
  - setInt()
  - setList()
  - setLong()
  - setShort()
  - setString()

REUSING AN APPLICATION OBJECT

FIELD OF THE INVENTION

The present invention relates to a method for reusing an application object generated upon a request for a structured composition from an application program, for example. More particularly, the invention relates to a method for reusing an application object for use with one or more application programs under the control of software such as middle-ware.

BACKGROUND ART

Structured compositions are used for describing information. An object provided with a structure such as DOM (Document Object Model), SDO (Service Data Object) or Bean is generated for the structured composition and communicated to an application program. Here, the application program often requires reusing an application object (hereinafter referred to an "object") generated once.

A programming technique for caching an object, which is generated once, in order to achieve the abovementioned reuse of an object is also known as a Flyweight pattern. This technique does not repeatedly generate an object in response to each request from an application program but saves the object and returns it to the application program instead.

The following document is considered:
[Patent Document 1] Japanese Patent Laid-Open No. 2004-62716

As an advanced technique to the Flyweight pattern, a technique of caching DOM that is the result of an XML structure analysis (for example Patent Document 1). In this technique, a cached object is only reused for reading. In other words, an object cached at an application server is reused only for reading.

PROBLEMS TO BE SOLVED BY THE INVENTION

However, in the technique described in Patent Document 1, a cached object is unable to be partly updated and reused. A once-generated object not only needs to be used as it is without a change but also to be reused with a partial update. The technique described in Patent Document 1 does not work to reuse an object in the latter occasion.

If an application program requires to update a reusing object and the object is updated, an object different from an originally generated one is cached with a possibility of causing nonconformity in the consistency or security of the objects. That is to say, if an object, which is saved and referenced to by an application program A, is reused and updated in response to a request from another application program B, the application program A will use the structure or value of the object without knowledge of its update. This causes nonconformity in the consistency or security of the object.

SUMMARY OF THE INVENTION

Therefore, an aspect of the present invention is to provide a method for reusing an application object for use with an application program, in which the object can be reused without causing nonconformity in the consistency or security, even if the object to be reused is updated.

The abovementioned problem is solved by the present invention which provides a method for reusing an application object for use with an application program, including: a reference detection step of detecting that said application program ends referring to said application object; an update detection step of detecting that said application object is updated by said application program; a reuse decision step of deciding to reuse said application object in response to detecting no update of said application object; and a reusing step of making said application object reusable in response to the end of referring to said object, and decision to reuse said application object.

Additionally, the present invention also makes the application object reusable by storing information on the location where the application object is stored (reference). Accordingly, with the present invention, since information on a reusable part of an object (reference) instead of the object to be reused itself is cached, an overhead due to caching is small.

Accordingly, with the present invention, since it is determined whether or not to reuse an object of one application program in response to the end of referring to the object and detecting no update of the object, it is possible to reuse the object without causing nonconformity in the consistency or security, even if the object to be reused is updated.

BRIEF DESCRIPTION OF THE DRAWINGS

For a more complete understanding of the present invention and the advantage thereof, reference is now made to the following description taken in conjunction with the accompanying drawings, in which:

FIG. 6 shows an example of a method for performing an update to DOM, which is an example of the present invention;

FIG. 7 shows an example of a method for making an update to SDO, which is an example of the present invention.

DESCRIPTION OF SYMBOLS

Figure 1:
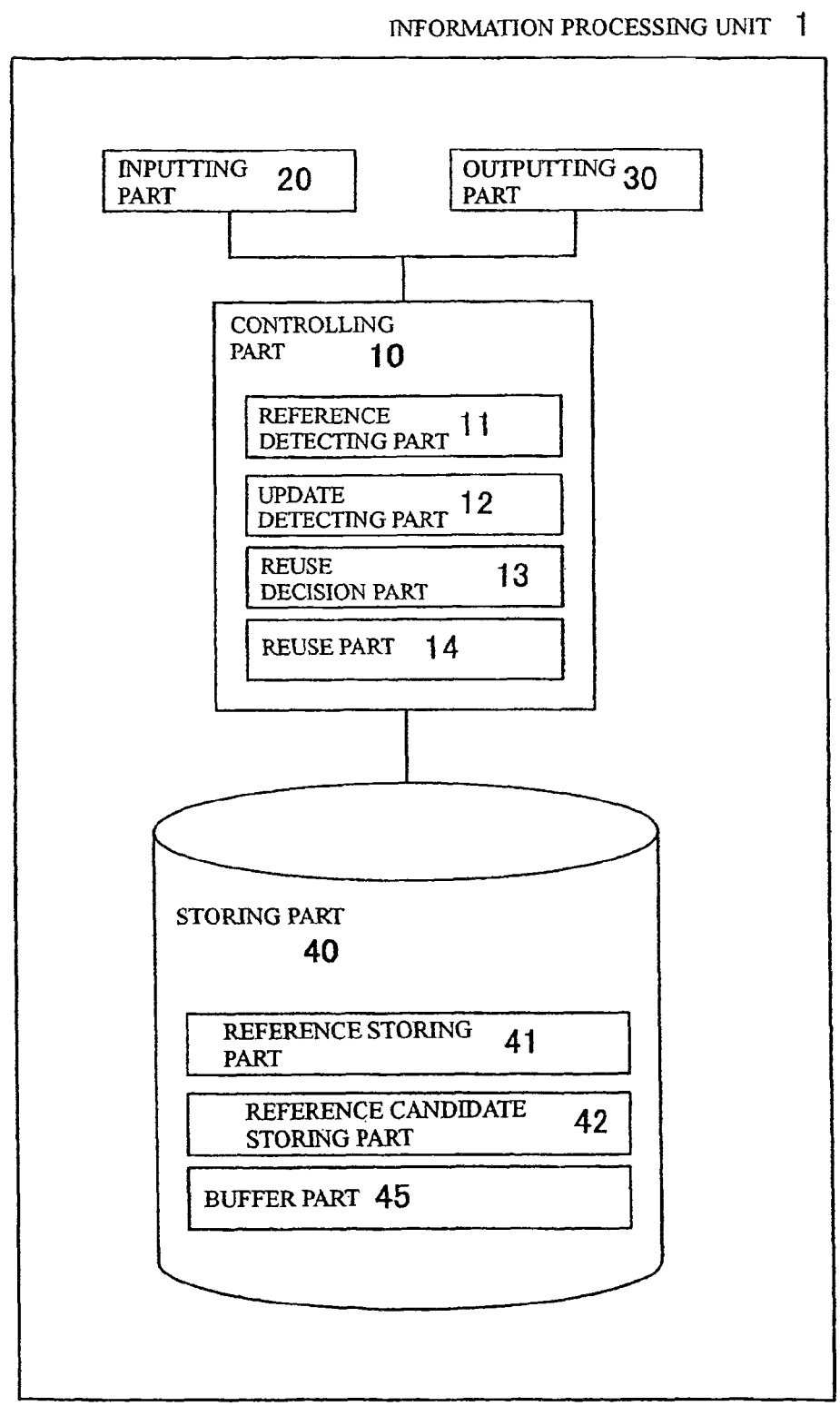
FIG. 1 is a diagram illustrating a hardware configuration of the information processing unit 1.

1 . . . information processing unit
10 . . . controlling part
11 . . . reference detecting part
12 . . . update detecting part
13 . . . reuse decision part
14 . . . reuse part
20 . . . inputting part
30 . . . outputting part
40 . . . storing part
41 . . . reference storing part
42 . . . reference candidate storing part
45 . . . buffer part

DETAILED DESCRIPTION OF THE INVENTION

The present invention provides methods for reusing an application object for use with an application program, in which the object can be reused without causing nonconformity in the consistency or security, even if the object to be reused is updated.

An embodiment of the present invention solves the abovementioned problems, following a dedicated study by providing a method for reusing an application object for use with an application program, including: a reference detection step of detecting that said application program ends referring to said application object; an update detection step of detecting that said application object is updated by said application program; a reuse decision step of deciding to reuse said application object in response to detecting no update of said application object; and a reusing step of making said application object reusable in response to the end of referring to said object, and decision to reuse said application object.

Thus, according to the present invention, it is detected that an application program ends referring to an application object, it is detected that the application object is updated by the application object, the application object is decided to be reused in response to detecting no update of the application object, the application object is made reusable in response to the end of referring to the object, and decision to reuse the application object.

Also, according to the present invention, since it is decided to reuse an object of one application program in response to the end of referring to the object and detecting no update of the object, it is possible to reuse the object without causing nonconformity in the consistency or security, even if the object to be reused is updated.

More specifically, in addition to the abovementioned configuration, the present invention also makes the application object reusable by storing information on the location where the application object is stored (reference). Accordingly, with the present invention, since information on a reusable part of an object (reference) instead of the object to be reused itself is cached, an overhead due to caching is small.

Accordingly, with the present invention, since it is determined whether or not to reuse an object of one application program in response to the end of referring to the object and detecting no update of the object, it is possible to reuse the object without causing nonconformity in the consistency or security, even if the object to be reused is updated.

Advantageous embodiments of the present invention will be described with reference to the drawings. As shown in FIG. 1, an information processing unit 1 includes a controlling part 10 for controlling application programs and data, and a storing part 40 for storing application programs and application objects (hereinafter simply referred to "objects"). The information processing unit 1 may further include an inputting part 20 for accepting inputs from a user and an outputting part 30 for outputting a result of an operation of an application program.

The information processing unit 1 is a device with a function of processing information and may be a computer. In the information processing unit 1, an application program and software (middleware) which works between the application program and OS (Operating System) operate.

The controlling part 10 is a central processing unit responsible for calculating and controlling application programs, objects, middleware and the like, which operates in the information processing unit 1 and may be a CPU (Central Processing Unit). The controlling part 10 includes a reference detecting part 11, an update detecting part 12, a reuse decision part 13 and a reuse part 14.

The reference detecting part 11 monitors an application program that is referring to an object and detects the end of the reference. The update detecting part 12 detects that an application program is going to update an object. The reuse decision part decides to reuse an object.

The reuse part 14 makes the object generated by an application reusable. The reuse part 14 makes the object reusable by storing information on a reusable part of the object (reference). The reuse part makes the object reusable by copying the object to be updated and storing the reference for the copied object in response to the detection that the object is to be updated.

The storing part 40 stores an OS, middleware, application programs, objects, references for the objects and the like of the information processing unit 1. That is to say, the storing part 40 stores programs and data to be handled in the information processing unit 1. For example, the storing part 40 may be memory or a hard disk of a computer. The storing part 40 may include a reference storing part 41, a reference candidate storing part 42 and a buffer part 45.

The reference storing part 41 stores a reference for an object which is made reusable. A reference is information on the location where an object is stored. The reference is made when an object is generated. A reference is an address or a pointer to indicate the location where an object is saved. The reference candidate storing part 42 stores a reference for a candidate for reusable object. The buffer part 45 stores an application program or an object itself. The buffer part 45 provides storage called "heap area" in Java® (registered trademark) language.

Figure 2:
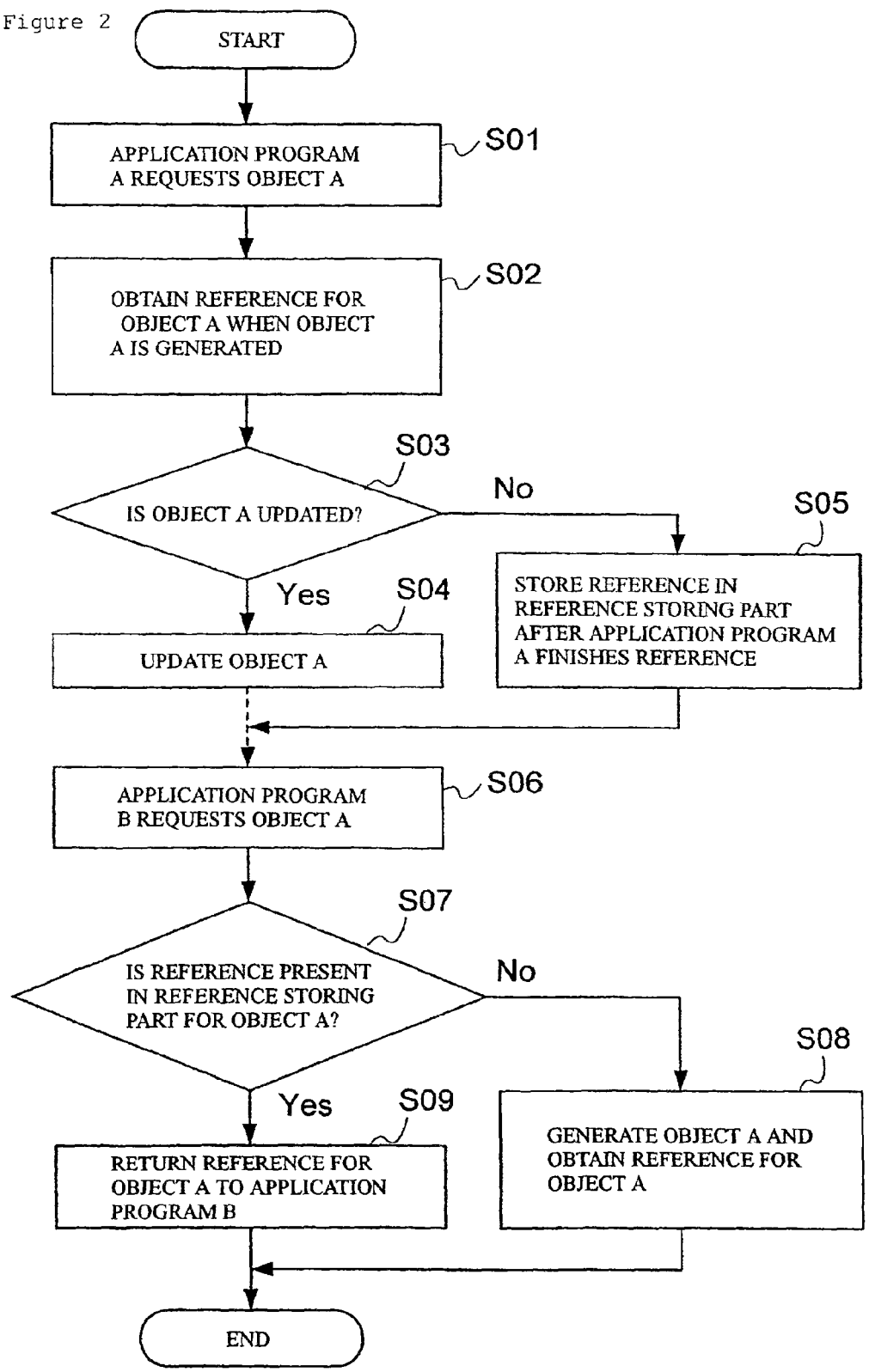
FIG. 2 is a flowchart showing operations performed by the information processing unit 1, which is an example of the present invention.

Next, a specific operation performed by the information processing unit 1 will be described with reference to the flowchart in FIG. 2.

First, an application program A, which is one application program operating in the information processing unit 1, requests an object A, which is one object (step S01). If the object A is requested by an application program for the first time, the object A is generated in response to the request for the first time and a reference for the object A is given at this time of generation (step S02). The application program uses the object A on the basis of the reference. If the information processing unit 1 does not detect that the application program updates the object A when it uses the object A (step S03), the information processing unit 1 causes the reference storing part 41 to store the reference when the application program A finishes the reference (step S05). If the information processing unit 1 detects that the application program updates the object, it updates the object without storing the reference (step S04).

Then, the process enters the reusing step. The application program A or an application program B, which is different from the application program A, requests the object A (step S06). As the object A is already generated, it is determined whether or not to reuse the object A. If the reference for the object A is present in the reference storing part 41 (step S07), the information processing unit 1 makes the object A to be reused by returning the stored reference to the application program B (step S09). If the reference for the object A is not present in the reference storing part 41 (step S07), the object A is generated and the reference for the object A is given (step S08).

Figure 3:
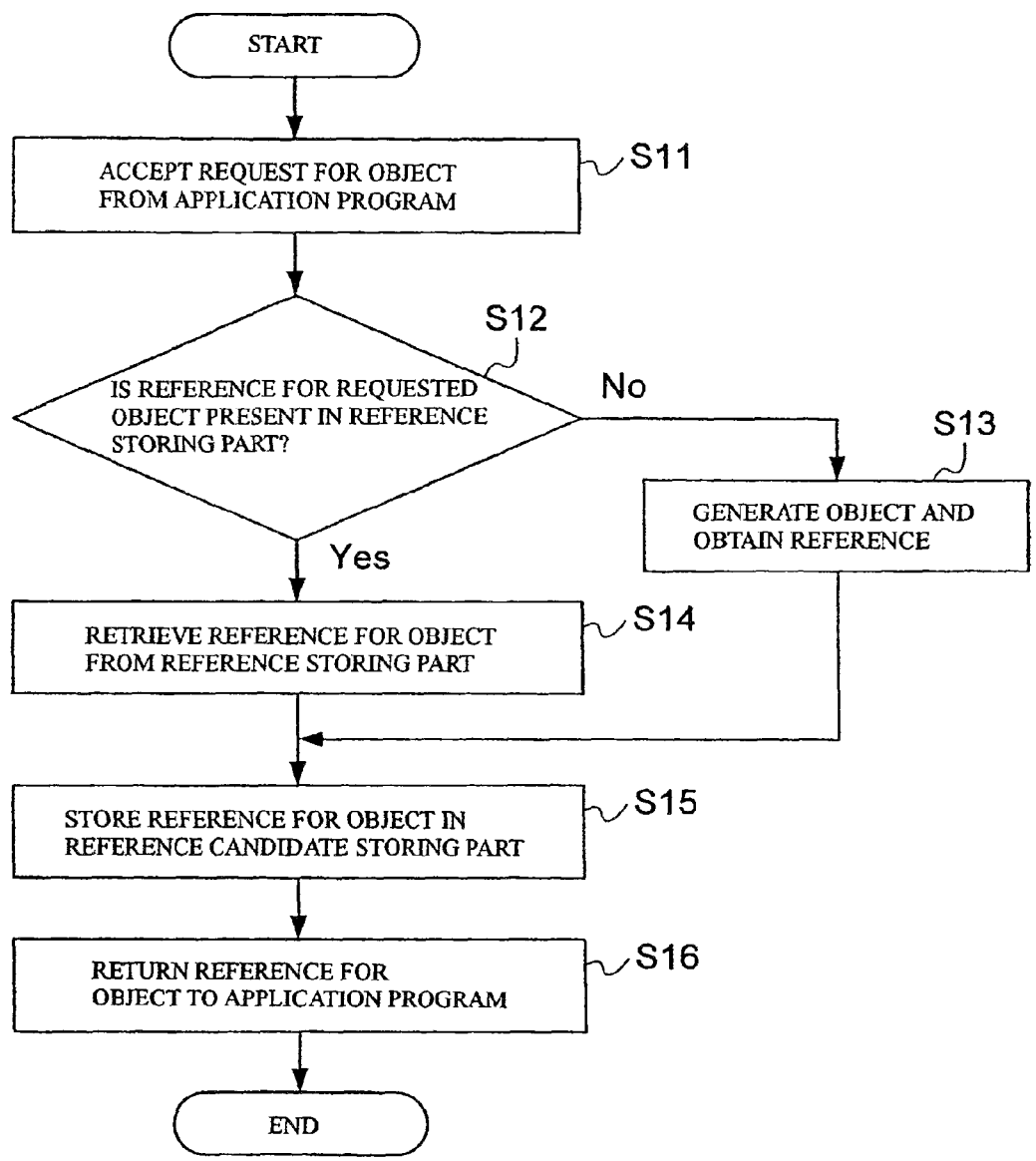
FIG. 3 is a flowchart showing operations performed by the information processing unit 1, which is an example of the present invention.
Figure 4:
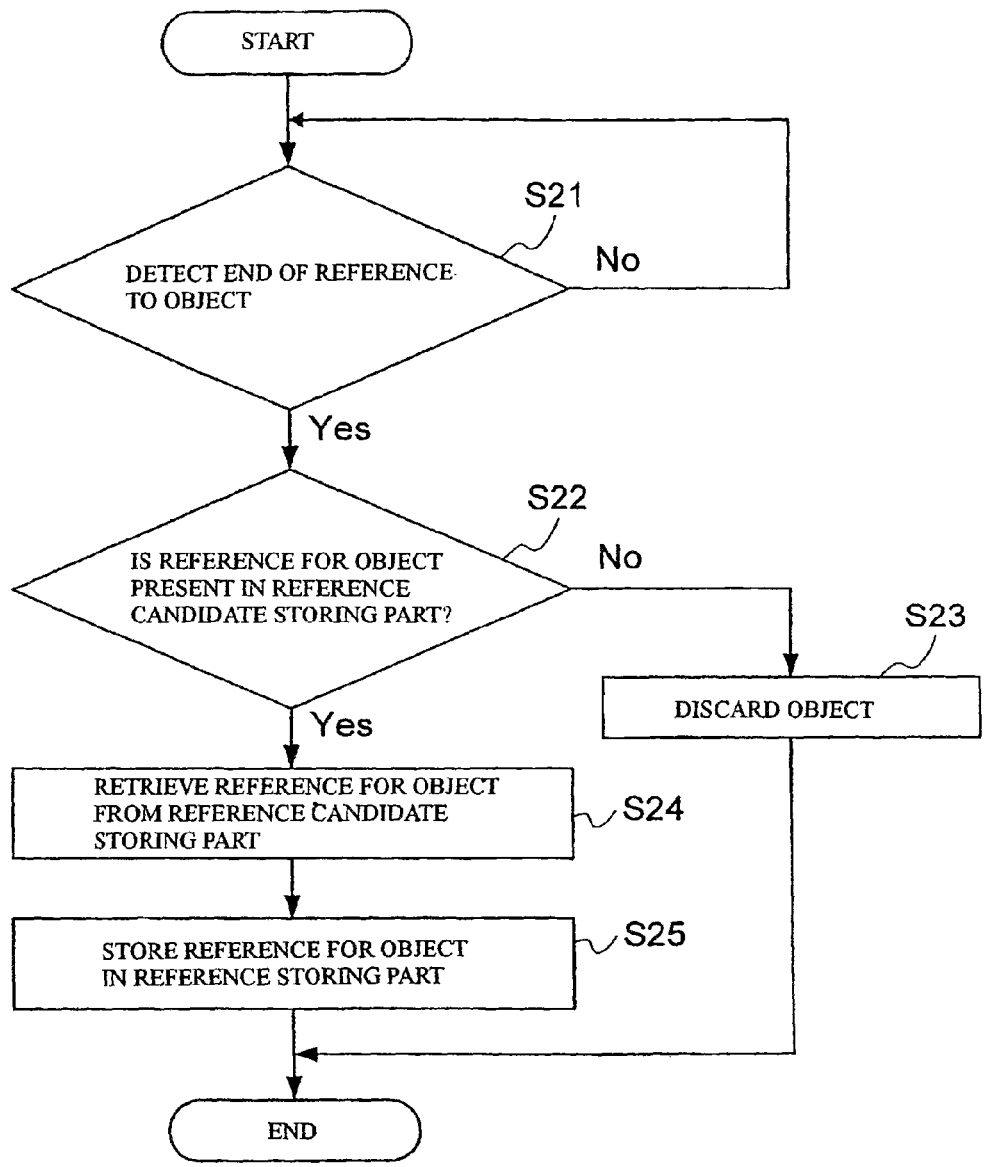
FIG. 4 is a flowchart showing operations performed by the information processing unit 1, which is an example of the present invention.
Figure 5:
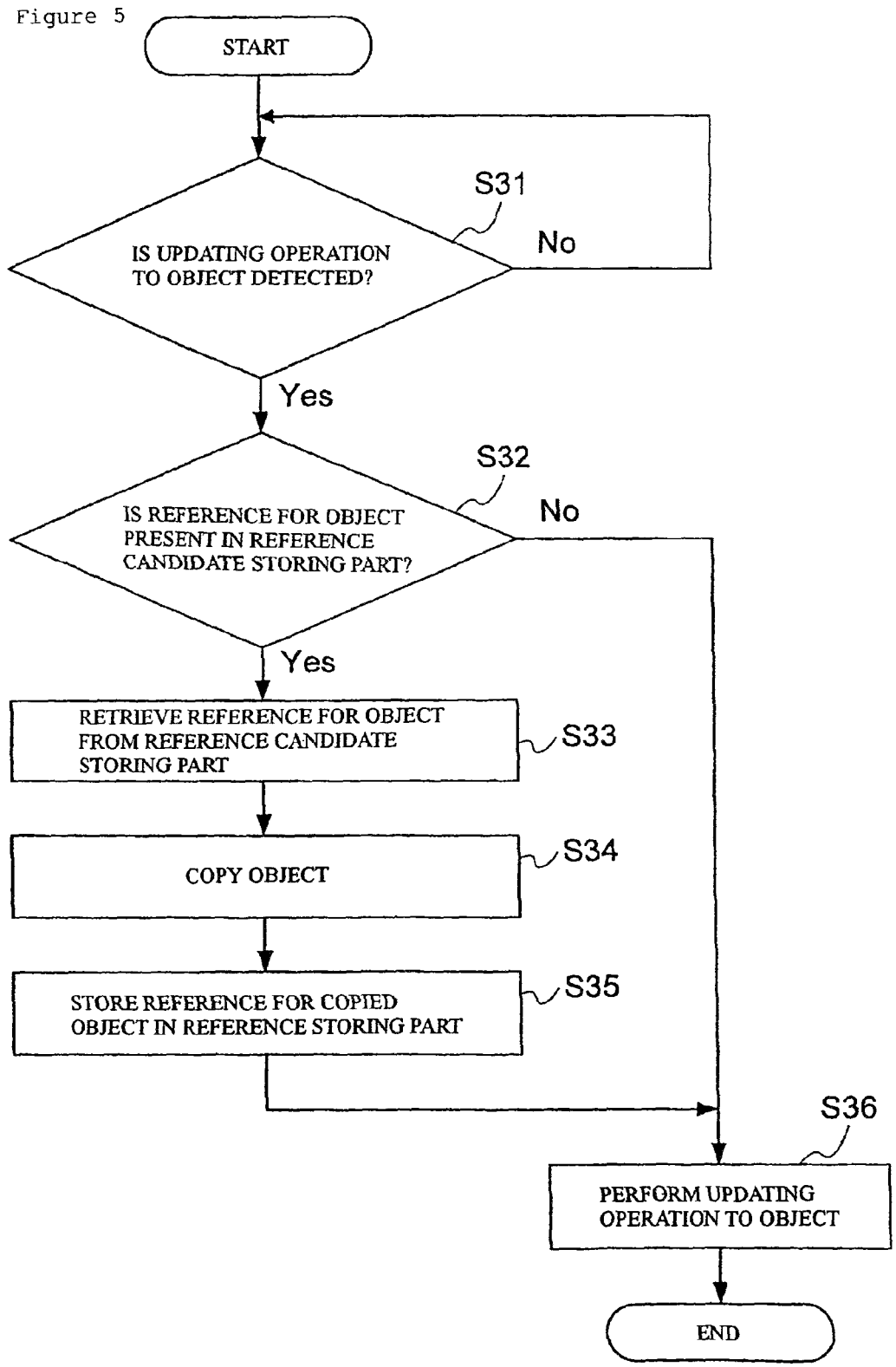
FIG. 5 is a flowchart showing operations performed by the information processing unit 1, which is an example of the present invention.

The operation of the present invention will be described in further detail. FIGS. 3, 4 and 5 are flowcharts illustrating that the present invention reuses an object by using the reference candidate storing part 42. First, the steps of retrieving a reference from the reference storing part 41 and storing the reference in the reference candidate storing part 42 will be described with reference to FIG. 3.

First, the controlling part 10 accepts a request for an object from an application program (step S11). Next, the reuse decision part 13 checks whether the reference for the requested object is stored in the reference storing part 41 (step S12). If the reference is stored in the reference storing part 41, the reuse part 14 retrieves the reference for the object from the reference storing part 41 (step S14) and stores the reference in the reference candidate storing part 42 (step S15). The retrieval at step S14 means that a reference is temporally cached in the buffer part 45 without left in the reference storing part 41.

If the reference for the requested object is not stored in the reference storing part 41, the reuse part 14 generates the requested object and obtains a reference (step S13), and stores the reference in the reference candidate storing part 42 (step S15). Finally, the reference for the object is returned to the application program (step S16).

Now, a flow of detecting the end of reference by an application program will be described with reference to FIG. 4.

The reference detecting part 11 detects the end of reference to an object by an application program (step S21). If it detects the end, the reference for the object is checked whether or not being stored in the reference candidate storing part 42 (step S22). If the reference is stored in the reference candidate storing part 42, the reference for the object is retrieved from the reference candidate storing part 42 (step S24) and stored in the reference storing part 41 (step S25). The retrieval at step S24 means that a reference is temporally cached in the buffer part 45 without left in the reference candidate storing part 42. If the reference is not stored in the reference candidate storing part 42, the object is discarded (deleted) (step S23). The situation of an object being not stored in the reference candidate storing part 42 means that the object is updated (to be described with reference to FIG. 5).

Now, processes performed when the operation to update an object is detected will be described with reference to FIG. 5.

When an application program is operating to update an object, the update detecting part 12 detects that the object is to be updated before it is actually updated (step S31). The reuse decision part 13 checks whether or not the reference for the object is stored in the reference candidate storing part 42 (step 32). The reference for the object is retrieved from the reference candidate storing part 42 (step S33). The retrieval at step S33 means that a reference is temporally cached in the buffer part 45 without left in the reference storing part 42. Next, the reuse part 14 copies (caches) the object (step S34) and stores the reference for the copied object in the reference storing part 41 (step S35). Then the updating operation to the object is performed (step S36).

As the reuse part 14 copies the object and stores the reference for the object before the object is actually updated, the update causes no problem in consistency and security of the object values or the like when the object and reference to be updated are used.

More specific example will be described below.
[Reference Management]

In order to detect that an application program ends referring to an object, the abovementioned reference detecting part 11 may use any one of or a combination of four approaches below.

1) An Approach by Using a Finalizer Mechanism

With this approach, the reference detecting part 11 detects that a reference to an object ends by using a mechanism, such as finalize ( ) in Java® language, which is invoked before the object is collected. It informs the application program of the fact with the object being revivable. A new object with a special finalizer is linked from the object in order to make the object revivable. (The link is made from a component of objects, which causes nonconformity when the reference is kept, or a component, which is referring the object. For example, the link needs to be made only from Document object in the case of DOM.) Given that the class of the object with a special finalizer is Resurrection, its implementation will be as below.

TABLE 1 class Document {
    Resurrection resurrector = reference to an Resurrection object;}
class Resurrection {
    Document resurrectee = reference to an object, which is a candidate for reuse;
    void finalize ( ) {
        if (the object is a candidate for reuse) {input the reference for the object in the reference storing part}
    }
}

2) An Approach of Tracing (Tracking) a Link from a Field of an Application Object With this approach, a technique generally used in a garbage collection is implemented as middleware by using a reflection mechanism or the like. The reference detecting part 11 traces a reference from a field of an application program, and determines that no reference is made for an object. If the reference detecting part 11 is unable to confirm that no reference is made in this narrow-ranged tracing, it may stop the tracing and determine that the reference can be saved. In the case that the reference may be saved, the object will be given up for the reuse, or reference management by the abovementioned finalizer mechanism may be used.

3) An Approach of Cooperating with Middleware, which Controls the Operation of an Application Program, Based on Information Given from a User or an Application Program or Information on Examination of a Code of an Application Program With this approach, the reference detecting part 11 determines that an application program does not keep saving an object on the basis of information on a setting file. The reference detecting part 11 examines the application code and detects that the application program cannot continue to save the object. As middleware, which controls the operation of an application program, controls to start and end a process, which uses the object, the end of the process can be detected. In this case, that the application program is not saving the object, which is handed to the application program, can be detected with the end of the process.

The present invention can perform the examination of a code, for example, by applying an escape analysis (ACM, TOPLAS Vol. 25 Issue 6, p. 713-775) used for stack allocation or synchronization deletion. If an object remains linked directly or indirectly from a field in an application program or a reference for the object is outside the range for the analysis, it is determined that the object is possibly saved. In this case, the reference is not reused or reference management techniques described in 1) or 2) are used.

4) An Approach of Reusing an Object for Each Thread on the Basis of Information Given from a User or an Application Program or Information on Examination of a Code of an Application Program With this approach, the reference detecting part 11 reuses an object for each thread by using thread local variables or the like (without reusing an object across threads). When an object needs to be reused in the same thread after the object is given to an application program, the process, which uses the object before the object is given to the application program, assuredly finished and it is determined that the object is not saved by the application program. This is only the case when multiple objects are not used in a single process of an application program. Code examination is the same as that in 3).

The reference management will be described by using a finalizer mechanism along with a flow in FIG. 4.

1) When an object, which is reusable for representing a message accepted from an application program, is in the first step (when the object is used for the first time), the controlling part 10 generates an object anew as in a typical process.

2) The reuse part 14 stores a reference of an object to be given to the application program in the reference candidate storing part 42 and makes it revivable.

3) The controlling part 10 gives the generated object to the application program.

4) When the finalizer mechanism detects that the application program ends the reference to the given object, the reuse part 15 stores the reference for the object in the reference storing part 41.

5) As the reusable object is stored in the reference storing part 41, this object is reused and, if necessary, updated and made an object corresponding to the newly accepted message.

[Update Detection]

As an approach to detect that an application program updates an object, the update detecting part 12 may use either of or a combination of two approaches below.

1) An Approach of Monitoring Invocation of a Method for Updating an Object

With this approach, all the implementation of methods, which perform updates, among the methods of the object class is inserted with a code informing of the update. For example, in the case of Node class of DOM, appendChild( ) accompanies with an update to a DOM tree, which is the object of method invocation, and a DOM tree, to which a node given by an argument is attributed. The implementation is as below.

TABLE 2

Node appendChild (Node newChild) {
    ((DocumentImpl) this.getDocument ( )). invalidate( );
    ((DocumentImpl) newChild.getDocument( )). invalidate ( );
    the original code of appendChild ( )
}

"DocumentImpl" is a subclass of Document class, which represents the entire document, and implementation of Document class provided by API (Application Interface). "invalidate( )" invoked for this class implements an algorithm "when an update is detected" shown below.

2) An Approach of Disabling Use of a Method for Performing an Update on the Basis of Information Given by a User or an Application Program or Information on Examination of a Code of an Application Program This approach specifies that an application program does not update an object with a setting file or detects that a method for updating an object is not invoked is detected by examining an application code. All the implementation of methods, perform updates, among the methods of the object class is inserted with a code for issuing an exception.

Code examination can be achieved by applying an escape analysis used in stack allocation or synchronization deletion. If an object remains linked directly or indirectly from a field in an application program or a reference for the object is outside the range for the analysis, it is determined that the object is possibly updated. If the object is possibly updated, the object is copied instead of reused or an update detection approach described in 1) is used. If an update to the object is detected with the approach described in 1), reuse of the object is simply disabled or the object is copied before the update for future reuse.

FIG. 6 shows an example of a method for performing an update to DOM. For the methods shown in FIG. 6, codes to inform of the invocation are inserted. The codes, such as an attribute value or a text element, which are known to be reset when they are reused and which cause no problem even after an update is made can be omitted.

The SDO (Service Data Object) is used for representing an object such as a parameter or a returning value of a service for Web Service. FIG. 7 shows an example of a method for making an update to SDO. For the methods shown here, codes to inform of the invocation are inserted.

The Bean is an object specific to an application program, which is used for representing an object such as a parameter or a returning value of a service for Web Service. Although the method, which is updated in Bean, differs for each application program, a method, called setter method, which is used for updating the Bean, can be identified from a method name (start with set) and meta-information called Bean Info. For setter methods, codes to inform of the invocation are inserted. As the Bean implementation is usually generated by using a development environment provided as a set with an application server, a method used for updating Bean can be identified by making the generation tool to generate the setter method with an information code inserted.

Update detection will be described more specifically along with a flow in FIG. 5.

1) As an object reusable for representing a message accepted from an application program does not exist at the first step, a new object is generated as in the typical process.

2) The reuse part 14 stores a reference for an object to be given to the application program in the reference candidate storing part 42 and make it revivable.

3) The controlling part 10 gives a generated object to the application program.

4) When the update detecting part 12 detects that an application program is to update an object, it retrieves the reference for the object from the reference candidate storing part 42.

5) The reuse part 14 copies the object to be updated and stores the object in the buffer part 45 and stores the reference for the object in the reference storing part 41.

6) The controlling part 10 performs the actual updating.

7) As an object reusable for representing the next accepted message is stored in the reference storing part 41, this object is reused and, if needed, updated and made as an object corresponding to a message accepted anew.

Figure 8:
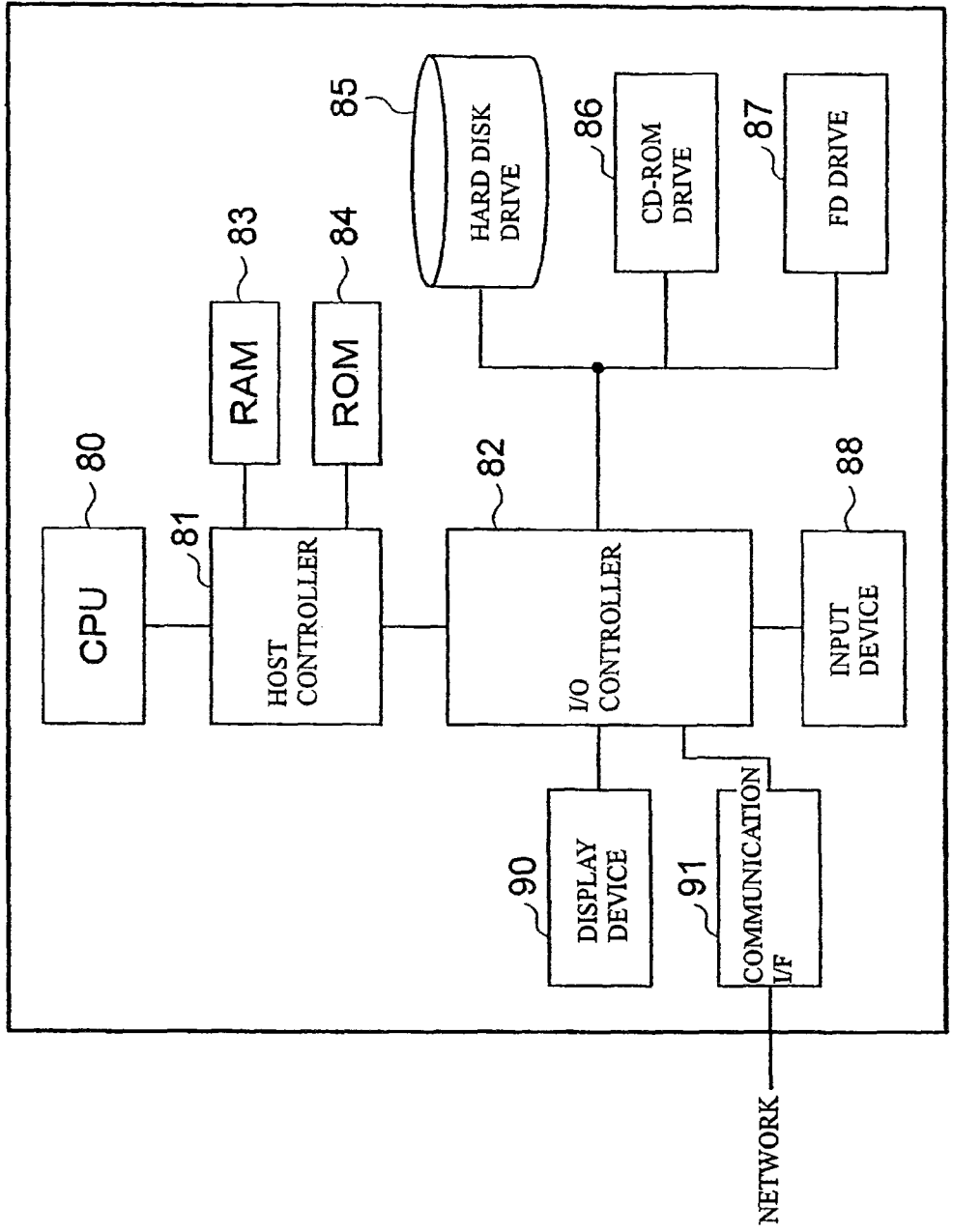
FIG. 8 illustrates a hardware configuration a computer used as the information processing unit 1, which is an example of the present invention.

The information processing unit 1 may include a CPU (Central Processing Unit) 80, a host controller 81, an I/O controller 82, RAM (Random Access Memory) 83, ROM (Read Only Memory) 84, a hard disk drive 85, a DVD/CD-ROM drive 86, an FD drive 87, an input device 88, which is a mouse, a keyboard or the like for accepting inputs from a user, as an inputting part 20, a display device 90 as an outputting part 30 and a communication interface 91 as shown in FIG. 8, for example.

An information processing unit for implementing the embodiment and a method for reusing an object can be implemented by a program executed at a computer or a server. Storage media for this program include an optical storage medium, a tape medium and semiconductor memory. A storage device, such as a hard disk or RAM, which is provided in a server system connected to a private communication network or the Internet, may be used as a storage medium for providing a program over the network.

Although the embodiment of the present invention has been described above, it simply exemplifies a specific example and does not limit the present invention. The effects described in the description of the embodiment of the present invention are simple listing of the most advantageous effects of the present invention and they don't limit the effect of the present invention.

Advantages of the invention include that the present invention is applicable to software used as middleware, further applicable to an XML purser or the like. Objects to be applied with the present invention may be SAAJ (SOAP with Attachments API for Java®) object.

Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention. Methods may be implemented as signal methods employing signals to implement one or more steps. Signals include those emanating from the Internet, etc.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed, is:

1. A method for reusing an object for use with an application program, comprising:
a reference detection step of using a computer processor to detect that said application program stops referring to said object;
wherein said reference detection step is configured to make said object revivable by linking the object with a second object having a special finalizer such that the link is a component of the second object;
an update determining step of determining that the object is an update candidate if the object is linked from a field in the application program, or a reference to the object is outside a range for analysis;
an update step of updating said object without storing a reference to said object;
an update detection step of detecting that said object is updated by said application program;
a reuse decision step of deciding to reuse said object in response to detecting no update of said object and reusing said object in response to the field in the application program referring to said object; and
a reusing step of making said object reusable in response to an end of referring to said object and a decision to reuse said object, and reusing said object for a plurality of threads by using local variables of each of the plurality of threads without reusing said object across the plurality of threads.

2. The method of claim 1, wherein said reusing step makes said object reusable by storing information on a location where said object is stored.

3. The method according to claim 2, wherein said reusing step makes said object reusable by copying the object to be updated and storing a reference for a copied object in response to the detection that said object is to be updated.

4. The method according to claim 2, wherein said reference detecting step detects the end of said reference by detecting that a reference from said application program ends by using a finalize method in Java® language.

5. The method according to claim 2, wherein said reference detecting step detects the end of said reference by detecting that a reference from said application program ends on a basis of information on a setting file.

6. The method according to claim 2, wherein said reference detecting step detects the end of said reference by detecting that a reference from said application program ends on a basis of a thread of said application program.

7. The method according to claim 1, wherein said update detection step detects that said object is to be updated by said application program from a method, which is updated by said application program.

8. The method according to claim 1, wherein said update detection step detects that said object is to be updated by said application program from information on examination of a code.

9. The method according to claim 1, wherein said update detection step detects that said object is to be updated by said application program from information on a setting file.

10. The method according to claim 1, wherein said update detection step detects that said object is to be updated by said application program by detecting one of: a method of DOM; a method of SDO; and a method of Bean.

11. An article of manufacture comprising a computer usable medium having computer readable program code means embodied therein for causing reuse of an object for use with an application program, the computer readable program code means in said article of manufacture comprising computer readable program code means for causing a computer to effect the steps of claim 1.

12. The method according to claim 1, wherein:
said reusing step makes said object reusable by one of storing information on a location where said object is stored and copying the object to be updated and storing a reference for a copied object in response to the detection that said object is to be updated;
said reference detecting step detects the end of said reference by detecting one of:
that a reference from said application program ends by using a finalize method in Java® language;
that a reference from said application program ends on a basis of a command indicating that said application program is to reference;
that a reference from said application program ends by dynamically tracing a link to an object from an application program;
that a reference from said application program ends on a basis of information on a setting file; and
that a reference from said application program ends on a basis of a thread of said application program; and
said update detection step detects that said object is to be updated by said application program from one of:
a method updated by said application program;
information on examination of a code; and
information on a setting file.

13. A computer program stored on a non-transitory computer usable medium and configured to reuse a first object for use with an application program, comprising:
a function that enables said application program to detect an end of referring to said first object, and is configured to make said first object revivable by linking the first object with a second object having a special finalizer such that the link is a component of the second object;
a function that discards the first object in response to said first object not being stored in a reference storage area;
a function that reuses said first object for a plurality of threads by using local variables of each of the plurality of threads without reusing said first object across the plurality of threads;
a function that detects that said first object is changed by said application program;
a function that regenerates the first object if a reference to said first object is not stored in the reference storage area;
a function that makes said first object reusable in response to the end of referring to said first object and decision of reusing said first object; and
a function that decides not to reuse said first object in response to detecting that said first object is linked to a field in the application program.

14. An information processing apparatus for reusing a first object for use with an application program, comprising:
a computer processor;
a reference detection part operating the computer processor configured to detect an end of referring to said first object by examining code of said application program and detecting, based on information in a setting file, that said application program cannot continue to save said first object,
wherein said reference detection part is configured to make said first object revivable by linking the first object with a second object having a special finalizer such that the link is a component of the second object;
a change detection part configured to detect that said first object is changed by said application program;
a reuse decision part configured to decide to reuse said object in response to detecting no change of said object;
a reuse decision part configured to decide to disable reuse of said object in response to detecting change of said object; and
a reuse part configured to make said object reusable in response to the end of referring to said object and decision of reusing said object.

15. The information processing unit according to claim 14, wherein said reuse part makes said object reusable by storing information on a reusable part of said object.

16. The information processing unit according to claim 15, wherein said reusing part makes said object reusable by copying an object to be updated and storing a reference for the copied object in response to the detection that said object is to be updated.

17. A computer program product comprising a non-transitory computer usable medium having computer readable program code means embodied therein for
causing reuse of an application object for use with an application program, the computer readable program code means in said computer program product comprising computer readable program code means for causing a computer to effect the functions of claim 14.

18. A program storage device comprising a non-transitory computer readable medium readable by machine, tangibly embodying a program of instructions executable by the machine to perform method steps for reusing an application object for use with an application program, said method steps comprising the steps of claim 1.

* * * * *